(12) United States Patent
Divorra Escoda et al.

(10) Patent No.: US 8,750,377 B2
(45) Date of Patent: Jun. 10, 2014

(54) METHOD AND APPARATUS FOR CONTEXT DEPENDENT MERGING FOR SKIP-DIRECT MODES FOR VIDEO ENCODING AND DECODING

(75) Inventors: Oscar Divorra Escoda, Barcelona (ES); Peng Yin, West Windsor, NJ (US)

(73) Assignee: Thomson Licensing, Boulogne-Billancourt (FR)

(*) Notice: Subject to any disclaimer, the term of this patent is extended or adjusted under 35 U.S.C. 154(b) by 578 days.

(21) Appl. No.: 12/450,800

(22) PCT Filed: Apr. 9, 2008

(86) PCT No.: PCT/US2008/004586
§ 371 (c)(1),
(2), (4) Date: Oct. 13, 2009

(87) PCT Pub. No.: WO2008/127597
PCT Pub. Date: Oct. 23, 2008

(65) Prior Publication Data
US 2010/0135387 A1     Jun. 3, 2010

Related U.S. Application Data

(60) Provisional application No. 60/911,489, filed on Apr. 12, 2007.

(51) Int. Cl.
*H04N 7/12* (2006.01)

(52) U.S. Cl.
USPC .................................................. 375/240.12

(58) Field of Classification Search
USPC ...................................... 375/240.01, 240.16

IPC ........................................................ H04N 7/12
See application file for complete search history.

(56) References Cited

U.S. PATENT DOCUMENTS

| 6,662,060 | B1 | 12/2003 | Maliszewski et al. |
| 7,970,058 | B2 * | 6/2011 | Suzuki ............... 375/240.16 |

(Continued)

FOREIGN PATENT DOCUMENTS

| EP | 1763034 | 3/2007 |
| GB | 2424534 | 9/2006 |

(Continued)

OTHER PUBLICATIONS

De Forni et al., "On the Benefits of Leaf Merging in Quad-Tree Motion Models," International Conference on Image Processing in Genova, Italy, Sep. 11, 2005, IEEE, Piscataway, NJ, vol. 2, pp. 858-861.

(Continued)

*Primary Examiner* — Dave Czekaj
*Assistant Examiner* — Tracy Li
(74) *Attorney, Agent, or Firm* — Vincent E. Duffy; Gregory S. Weaver (57) ABSTRACT

There are provided methods and apparatus for context dependent merging for SKIP/DIRECT modes for video encoding and decoding. An apparatus includes an encoder for joint coding partitions of an image region using frame partitioning and a partition merging procedure, wherein any given one of the partitions that use a coding mode with implicit coding rules is subject to being merged, with another one of the partitions, using a distinct merging rule different than that used for a coding mode with explicit coding rules.

21 Claims, 5 Drawing Sheets

(56) References Cited

U.S. PATENT DOCUMENTS

| | | | |
|---|---|---|---|
| 2003/0146915 A1 | 8/2003 | Brook et al. | |
| 2004/0028282 A1* | 2/2004 | Kato et al. | 382/236 |
| 2004/0067044 A1 | 4/2004 | Hsu et al. | |
| 2004/0086047 A1* | 5/2004 | Kondo et al. | 375/240.16 |
| 2004/0114817 A1 | 6/2004 | Jayant et al. | |
| 2005/0094972 A1 | 5/2005 | Green | |
| 2006/0188237 A1 | 8/2006 | Watanabe et al. | |
| 2006/0203911 A1 | 9/2006 | Zhou et al. | |
| 2007/0217500 A1* | 9/2007 | Gao et al. | 375/240.01 |
| 2008/0008242 A1* | 1/2008 | Lu et al. | 375/240.16 |

FOREIGN PATENT DOCUMENTS

| | | |
|---|---|---|
| JP | 2006004520 | 1/2006 |
| WO | 9428480 | 12/1994 |
| WO | WO2005004491 | 1/2005 |
| WO | 2006095300 | 9/2006 |
| WO | 2007018308 | 2/2007 |

OTHER PUBLICATIONS

Liu et al., "Segmentation-Based Coding of Motion Difference and Motion Field Images for Low Bit-Rate Video Compression," Proceedings of the International Conference on Acoustics, Speech and Signal Processing, Mar. 23, 1992, IEEE, NY, pp. III-525-III-528.

Shukla et al., "Rate-Distortion Optimized Tree-Structured Compression Algorithms for Piecewise Polynomial Images," IEEE Transactions on Image Processing, vol. 14, No. 3, Mar. 2005, pp. 343-359.

Yang et al., "Rate-Constrained Motion Estimation and Perceptual Coding," Proceedings of International Conference on Image Processing in Santa Barbara, CA, IEEE, vol. 1, Oct. 26, 1997, pp. 81-84.

Zhang et al., "Region-based Coding of Motion Fields for Low-Bitrate Video Compression," International Conference on Image Processing (ICIP), IEEE, Piscataway, NJ, vol. 2, Oct. 24, 2004, pp. 1117-1120.

International Search Report, dated Oct. 6, 2008.

* cited by examiner

METHOD AND APPARATUS FOR CONTEXT DEPENDENT MERGING FOR SKIP-DIRECT MODES FOR VIDEO ENCODING AND DECODING

This application claims the benefit, under 35 U.S.C. §365 of International Application PCT/US2008/04586 and filed Apr. 9, 2008, which was published in accordance with PCT Article 21(2) on Oct. 23, 2008, in English and which claims the benefit of U.S. Provisional Patent Application No. 60/911,489, filed on Apr. 12, 2007, in English.

TECHNICAL FIELD

The present principles relate generally to video encoding and decoding and, more particularly, to a method and apparatus for context dependent merging for SKIP/DIRECT modes for video encoding and decoding.

BACKGROUND

In the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), SKIP and DIRECT modes are very special modes. SKIP and Direct modes do not include any bits for motion vectors. SKIP and DIRECT modes are optimized for low bitrate, with a proper tradeoff between distortion and bitrate. Motion vectors are derived from spatial and/or temporal neighbors. In the case of SKIP mode, the residue is set to zero.

Thus, SKIP and DIRECT modes use an implicit rule in order to derive motion information from neighboring blocks without the transmission of any extra side information. Side information used in coding schemes with block merging may introduce a coding penalty in SKIP and DIRECT coding modes due to the extra data to be sent.

Figure 1:
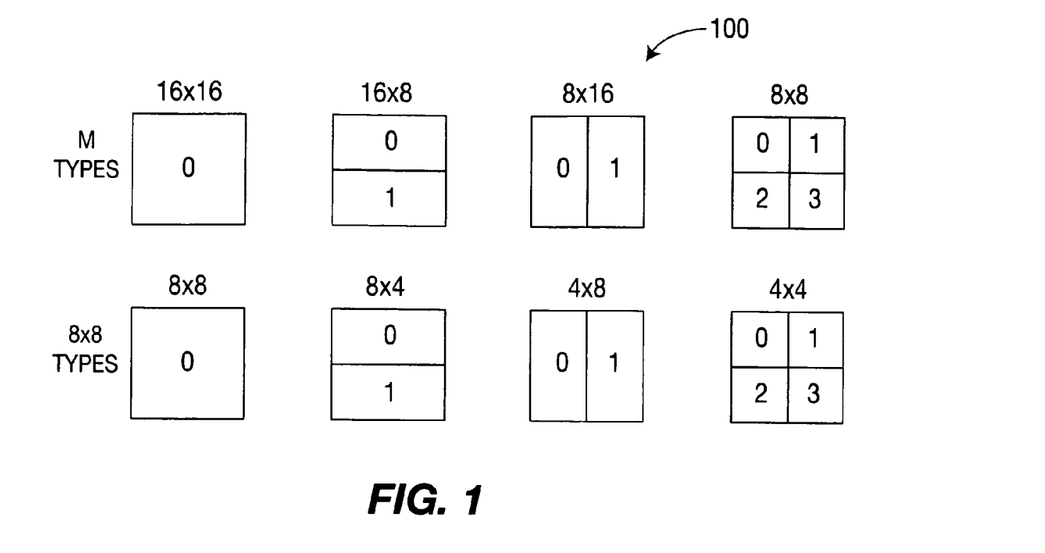
FIG. 1 is a block diagram for MPEG-4 AVC Standard coding modes to which the present principles may be applied.

Tree-structured video data partitioning is present in current major video coding standards. Video standards mostly use tree-structured video data partitioning for frame partitioning in order to adapt the coding mode, and the coding of video data, depending on the video signal. H.261, MPEG-1, and MPEG-2/H.262 support only 16×16 MB partitions. The MPEG-4 Standard simple profile or H.263(+) support both 16×16 and 8×8 partitions for a 16×16 MB. The MPEG-4 AVC Standard supports tree-structured hierarchical macroblock partitions. A 16×16 MB can be broken into macroblock partitions of sizes 16×8, 8×16, or 8×8. 8×8 partitions are also known as sub-macroblocks. Sub-macroblocks can be further broken into sub-macroblock partitions of sizes 8×4, 4×8, and 4×4. Turning to FIG. 1, MPEG-4 AVC Standard coding modes are indicated generally by the reference numeral 100.

Figure 2:
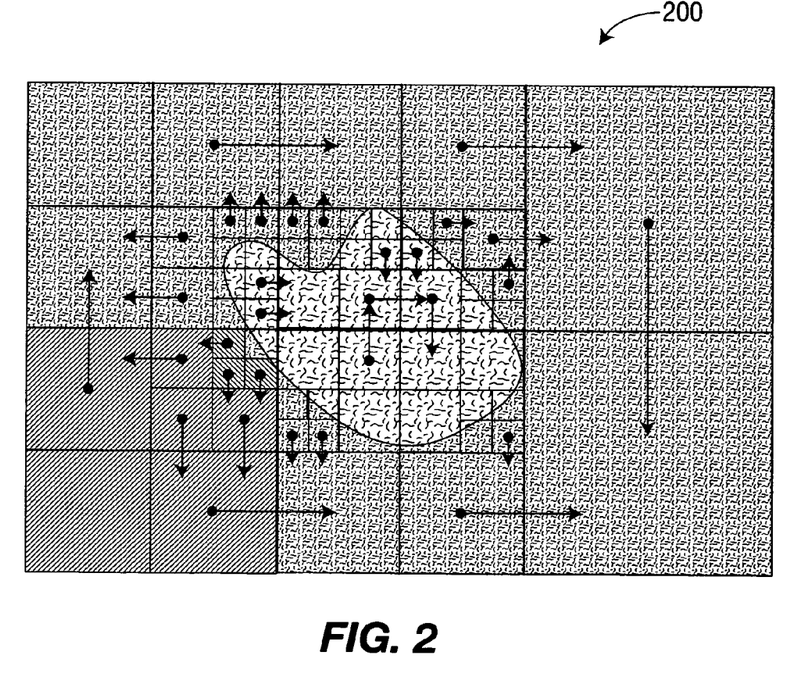
FIG. 2 is a diagram for an exemplary scheme for a possible merging rule after a first tree decomposition stage for region-based motion compensation and coding, in accordance with the prior art.

Sometimes, though, simple quad-tree partitioning of video data is not enough to achieve the best possible coding efficiency. During the procedure of partitioning, some blocks in a neighborhood may end up including similar data. This data would be better coded if encoded jointly in a single block. However, these neighboring blocks may depend on different parents in the tree-structured partitioning. In such a case, no joint coding is possible. Also, in a given block such as a macroblock, one may want to jointly code only a part of the sub-blocks in an arbitrary pattern, but not all of the sub-blocks. A prior approach to overcoming such a limitation is joint coding of neighboring blocks by leaf merging after tree decomposition. It has been proposed to port the preceding prior art approach to the MPEG-4 AVC Standard for joint coding of motion data of neighboring blocks. The proposed porting uses additional side information to indicate which blocks are jointly coded. This side information indicates which blocks merge to which blocks in order to generate segments sharing the same motion information. Turning to FIG. 2, an exemplary scheme for a possible merging rule after a first tree decomposition stage for region-based motion compensation and coding. In FIG. 2, possible mergings of macroblocks, macroblock partitions, sub-macroblocks, and/or sub-macroblock partitions are respectively indicated by arrows. In one embodiment, a merge flag is used to indicate if the block is merged with another block. A signal of a merge direction is used to indicate to which block the current block is merged to, when the current block has more than one possible merging candidate. Disadvantageously, this prior approach disregards the fact that the MPEG-4 AVC Standard has statistically optimized modes for efficient coding of regions where video data (such as motion) can be directly derived by means of a predictor (such as SKIP or Direct Modes), and where no information about motion (and residual for SKIP) is encoded. In some cases, any additional information for the description of motion introduced in such modes can lead to a loss in coding efficiency. This is the case for the proposed merging information described above. In some sense, SKIP and DIRECT modes can be considered as an implicit merging operation of the SKIP/Direct block with the block that has the same motion vector the generated by the predictor. Hence, extra side information to indicate joint coding with some other block or direction of merging within a SKIP and/or DIRECT mode may lead to the introduction of unnecessary redundancy and, consequently, to a loss in rate-distortion (R-D) efficiency.

SUMMARY

These and other drawbacks and disadvantages of the prior art are addressed by the present principles, which are directed to a method and apparatus for context dependent merging for skip/direct modes for video encoding and decoding.

According to an aspect of the present principles, there is provided an apparatus. The apparatus includes an encoder for joint coding partitions of an image region using frame partitioning and a partition merging procedure, wherein any given one of the partitions that use a coding mode with implicit coding rules is subject to being merged, with another one of the partitions, using a distinct merging rule different than that used for a coding mode with explicit coding rules.

According to another aspect of the present principles, there is provided a method. The method includes joint coding partitions of an image region using frame partitioning and a partition merging procedure, wherein any given one of the partitions that use a coding mode with implicit coding rules is subject to being merged, with another one of the partitions, using a distinct merging rule different than that used for a coding mode with explicit coding rules.

According to yet another aspect of the present principles, there is provided an apparatus. The apparatus includes a decoder for joint decoding partitions of an image region using frame partitioning and a partition merging procedure, wherein any given one of the partitions that use a coding mode with implicit coding rules is subject to being merged, with another one of the partitions, using a distinct merging rule different than that used for a coding mode with explicit coding rules.

According to a further aspect of the present principles, there is provided a method. The method includes joint decoding partitions of an image region using frame partitioning and a partition merging procedure, wherein any given one of the partitions that use a coding mode with implicit coding rules is subject to being merged, with another one of the partitions, using a distinct merging rule different than that used for a coding mode with explicit coding rules.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to a method and apparatus for context dependent merging for skip/direct modes for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Figure 3:
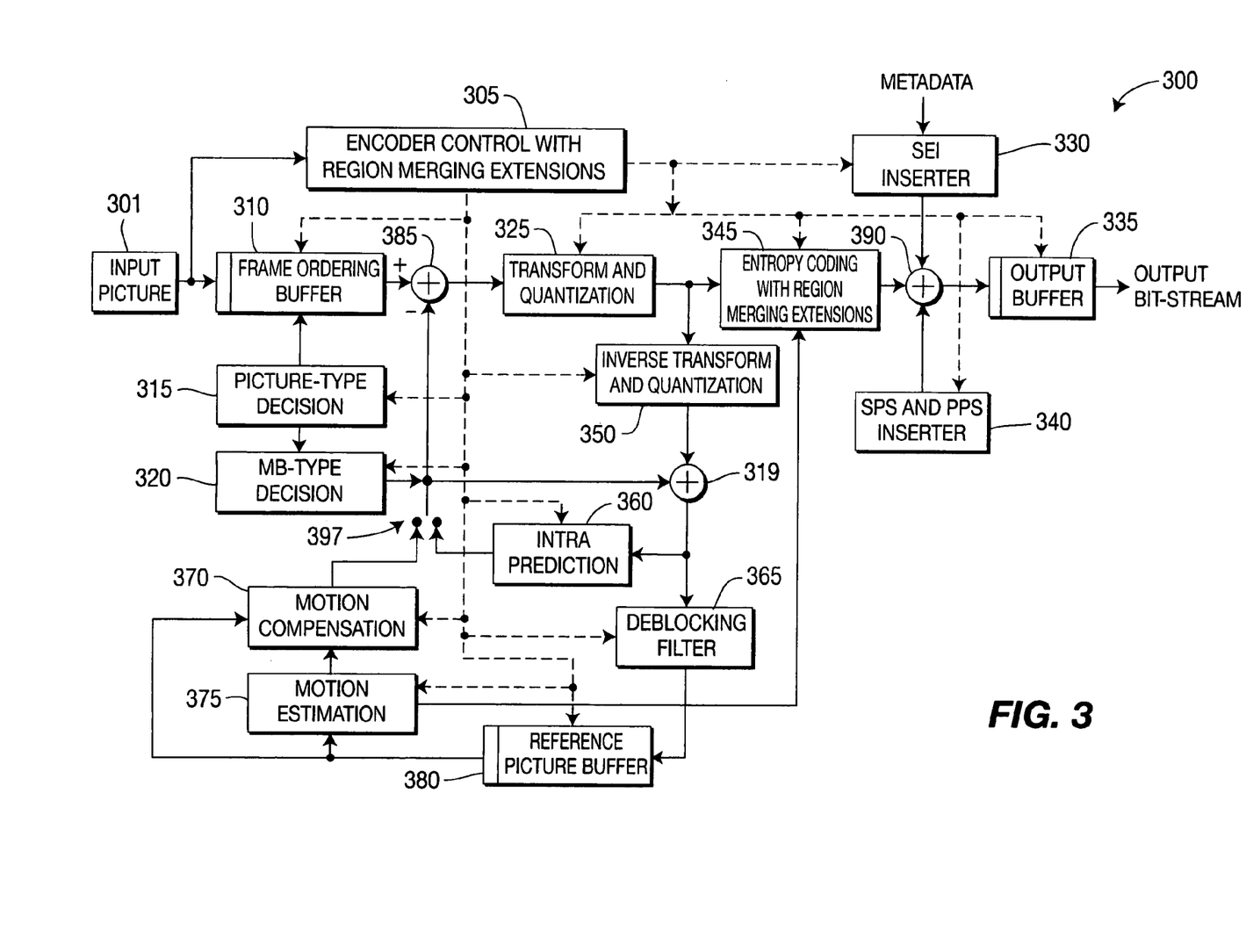
FIG. 3 is a block diagram for an exemplary encoder to which the present principles may be applied, in accordance with an embodiment of the present principles.

Turning to FIG. 3, a video encoder capable of performing video encoding in accordance with the MPEG-4 AVC standard is indicated generally by the reference numeral 300.

The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder with region merging extensions 345 and a first input of an inverse transformer and inverse quantizer 350. An output of the entropy coder with region merging extensions 345 is connected in signal communication with a first non-inverting input of a combiner 390. An output of the combiner 390 is connected in signal communication with a first input of an output buffer 335.

A first output of an encoder controller with region merging extensions 305 is connected in signal communication with a second input of the frame ordering buffer 310, a second input of the inverse transformer and inverse quantizer 350, an input of a picture-type decision module 315, an input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller with region merging extensions 305 is connected in signal communication with a first input of a Supplemental Enhancement Information (SEI) inserter 330, a second input of the transformer and quantizer 325, a second input of the entropy coder 145, a second input of the output buffer 335, and an input of the Sequence Parameter Set (SPS) and Picture Parameter Set (PPS) inserter 340.

A first output of the picture-type decision module 315 is connected in signal communication with a third input of a frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375. A first output of the motion estimator 375 is connected in signal communication with a second input of the motion compensator 370. A second output of the motion estimator 375 is connected in signal communication with a third input of the entropy coder with region merging extensions 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and with an inverting input of the combiner 385.

Inputs of the frame ordering buffer 310 and the encoder controller with region merging extensions 305 are available as input of the encoder 300, for receiving an input picture 301. Moreover, an input of the Supplemental Enhancement Information (SEI) inserter 330 is available as an input of the encoder 300, for receiving metadata. An output of the output buffer 335 is available as an output of the encoder 300, for outputting a bitstream.

Figure 4:
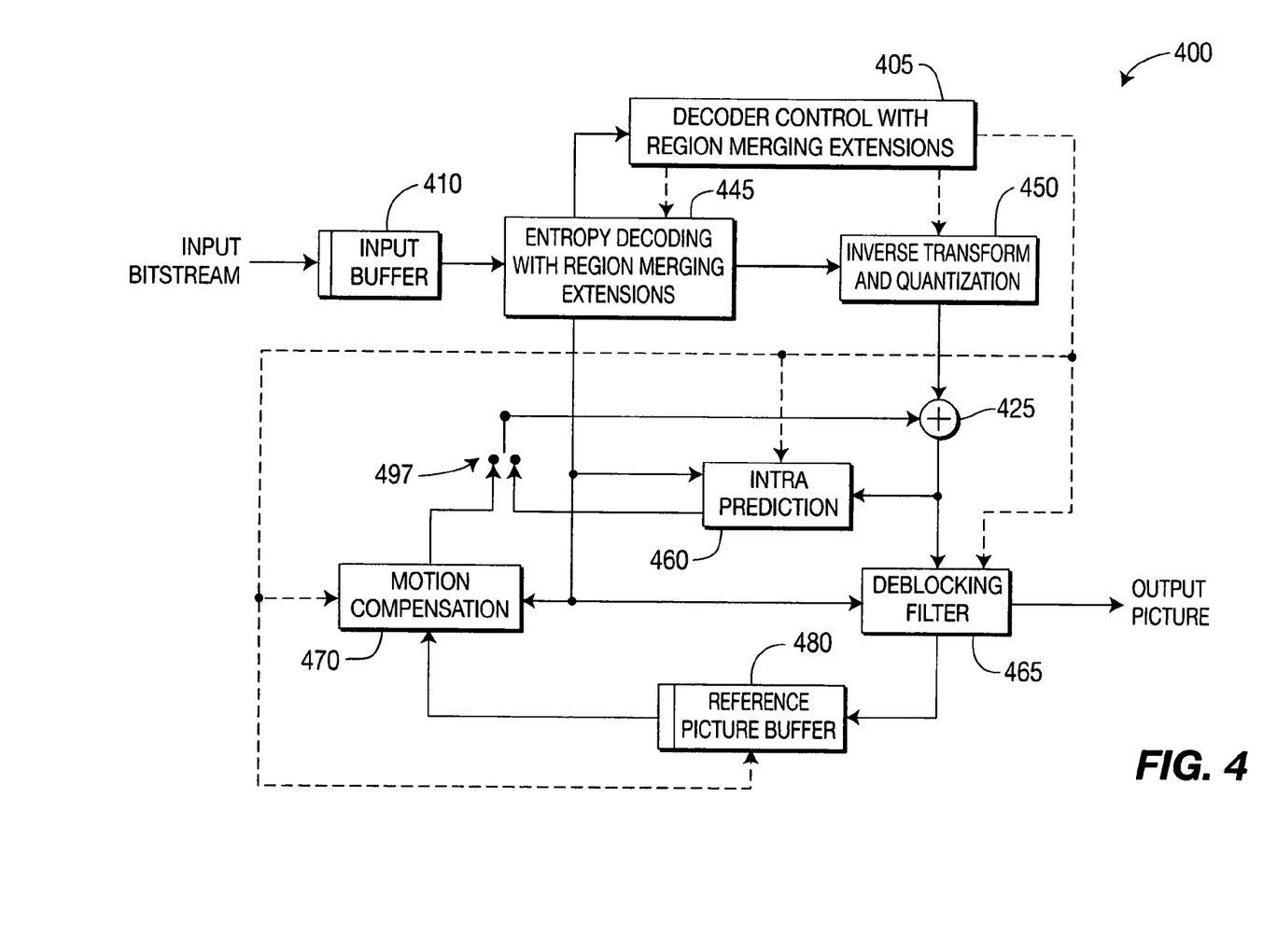
FIG. 4 is a block diagram for an exemplary decoder to which the present principles may be applied, in accordance with an embodiment of the present principles.

Turning to FIG. 4, a video decoder capable of performing video decoding in accordance with the MPEG-4 AVC standard is indicated generally by the reference numeral 400.

The video decoder 400 includes an input buffer 410 having an output connected in signal communication with a first input of the entropy decoder with region merging extensions 445. A first output of the entropy decoder with region merging extensions 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder with region merging extensions 445 is connected in signal communication with a third input of the motion compensator 470 and a first input of the deblocking filter 465. A third output of the entropy decoder with region merging extensions 445 is connected in signal communication with an input of a decoder controller with region merging extensions 405. A first output of the decoder controller with region merging extensions 405 is connected in signal communication with a second input of the entropy decoder with region merging extensions 445. A second output of the decoder controller with region merging extensions 405 is connected in signal communication with a second input of the inverse transformer and inverse quantizer 450. A third output of the decoder controller with region merging extensions 405 is connected in signal communication with a third input of the deblocking filter 465. A fourth output of the decoder controller with region merging extensions 405 is connected in signal communication with a second input of the intra prediction module 460, with a first input of the motion compensator 470, and with a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

As noted above, the present principles are directed to a method and apparatus for context dependent merging for skip/direct modes for video encoding and decoding.

It is to be appreciated that, in some cases, syntax indicating joint coding of a given block with another block can be useful to further improve coding efficiency. In an embodiment, the present principles are used to identify such cases. Moreover, a conditional coding rule is introduced for enabling/disabling the possibility of joint coding within SKIP and DIRECT modes depending on the context of neighboring blocks. Moreover, any general coding mode with an implicit coding rule for video data (SKIP/Spatial DIRECT modes would be a special case when the implicitly coded video data is motion and the coding rule is a median predictor) can use the present principles. Indeed, it is to be appreciated that the problem described herein for the case of motion can also appear in the context of other implicitly derived video data.

The present principles address the use of SKIP and DIRECT modes within coding schemes with joint coding of blocks prediction. A context dependent rule is used in such modes to enable/disable the use of merging information. This avoids losing R-D performance when merging information is of no use in SKIP and DIRECT modes. More generally, the present principles are extensible to a context dependent rule for enabling/disabling the use of merging information for joint coding of video data blocks and/or regions with implicit derivation rules for coding the video data.

Thus, in accordance with an embodiment of the present principles, we define a rule for the adaptive use of merging information within frame partitions that use coding modes with implicit coding rules for video data.

In an embodiment of modes with implicit coding rules, we find SKIP and DIRECT modes. In the embodiment, motion data is implicitly coded using a derivation rule. This derivation rule relies on a predictor that, based on available decoded data, generates an estimate of the motion in the SKIP/DIRECT coded block. Typical predictors for this purpose (and in particular that used by the MPEG-4 AVC Standard) are median predictors from spatial neighbors or collocated predictors from temporal neighbors. These kind of coding modes could be applied without limitation to other kinds of video data, such as intra coding directional modes, or model parameters in models used for image/video coding based on model fitting.

In some sense, coding modes with implicit coding rules can be seen as an implicit merging operation. In the case where the median predictor is used as the implicit data derivation rule, the implicit merging is the merging of the SKIP/DIRECT block with the block that has the same motion vector generated by the predictor.

In an embodiment, a case is identified where the use of merging side information is adaptively enabled or disabled within coding modes that use implicit coding rules. Given a frame partition using implicit coding rules, the decision of whether or not to use merging information is based upon the neighboring partition modes and merging information.

The following description relates to the preceding embodiment with respect to SKIP or DIRECT mode.

A situation where SKIP/DIRECT macroblocks may be affected in the merging paradigm is when a SKIP/DIRECT macroblock is subject to the possibility of being merged to some other block (typically 16×16 or another SKIP/DIRECT mode). In order to not include unnecessary payload bits, SKIP/DIRECT modes do not include merging information by default. Indeed, they are not merged by default. The only situation where a SKIP/DIRECT mode can be merged to some other block is when the SKIP/DIRECT mode block has already some entering merging leaf. Indeed, if another block has been merged to a SKIP/DIRECT block, this means that there are already some savings guaranteed for that block, so some extra bits can be afforded to indicate a merging decision with respect to another block. Also, SKIP/DIRECT mode data syntax is modified in the following sense. If a block is merging to a SKIP/DIRECT macroblock, and the SKIP/DIRECT macroblock is the first block of the segment in scanning order, then the SKIP/DIRECT macroblock data syntax may include explicit syntax with motion information for the merged segment.

Figure 5:
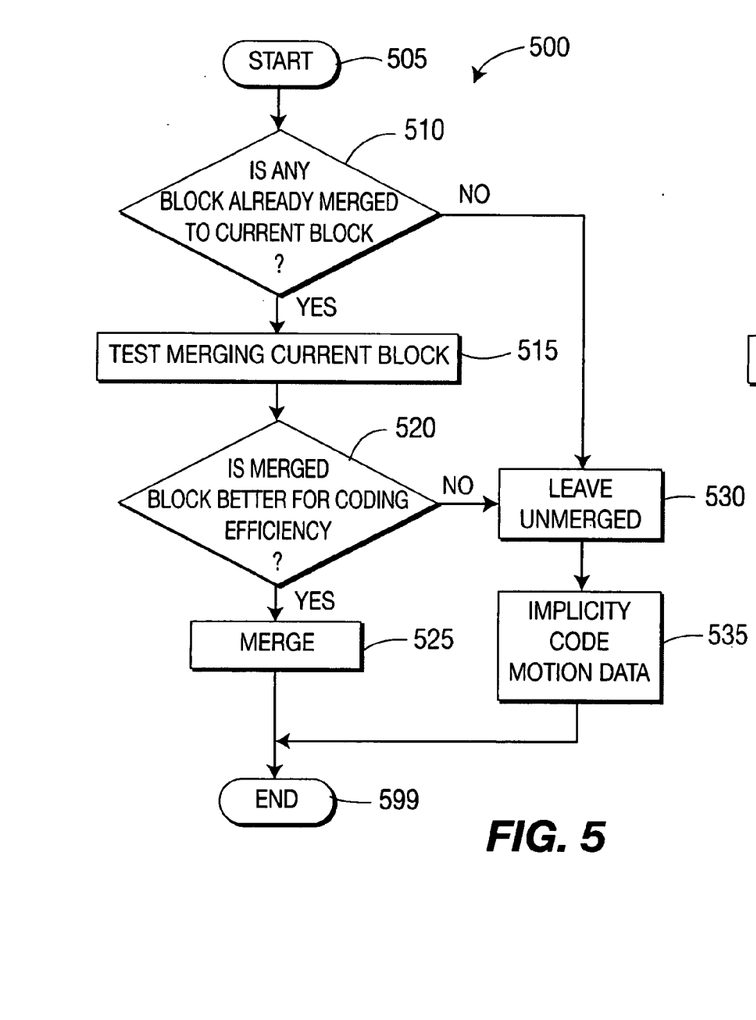
FIG. 5 is a flow diagram for an exemplary method for performing a merge procedure at a video encoder for a merge enabled SKIP mode, in accordance with an embodiment of the present principles.

Turning to FIG. 5, an exemplary method for performing a merge procedure at a video encoder for a merge enabled SKIP mode is indicated generally by the reference numeral 500.

The method 500 includes a start block 505 that passes control to a decision block 510. The decision block 510 determines whether or not any block is already merged to the current block. If so, then control is passed to a function block 515. Otherwise, control is passed to a function block 530.

The function block 515 tests merging the current block, and passes control to a decision block 520. The decision block 520 determines whether or not the merged block is better for coding efficiency. If so, then control is passed to a function block 525. Otherwise, control is passed to the function block 530.

The function block 525 merges the current block, and passes control to an end block 599.

The function block 530 leaves the current block unmerged, and passes control to a function block 535. The function block 535 implicitly codes motion data for the current block, and passes control to the end block 599.

Figure 6:
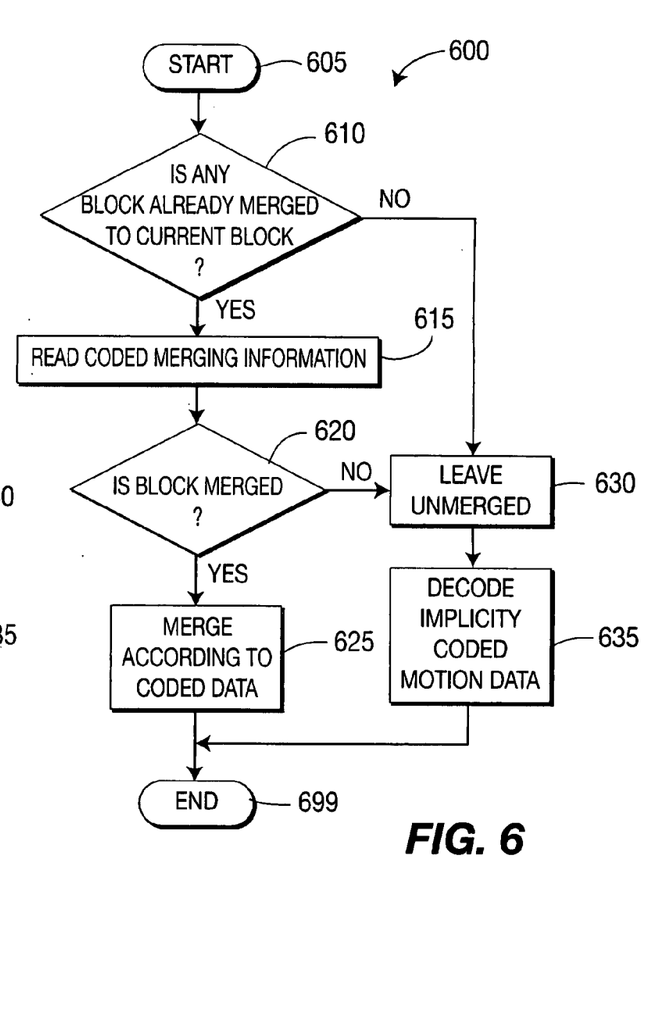
FIG. 6 is a flow diagram for an exemplary method for performing a merge procedure at a video decoder for a merge enabled SKIP mode, in accordance with an embodiment of the present principles.

Turning to FIG. 6, an exemplary method for performing a merge procedure at a video decoder for a merge enabled SKIP mode is indicated generally by the reference numeral 500.

The method 600 includes a start block 605 that passes control to a decision block 610. The decision block 610 determines whether or not any block is already merged to the current block. If so, then control is passed to a function block 615. Otherwise, control is passed to a function block 630.

The function block 615 reads coded merging information, and passes control to a decision block 620. The decision block 620 determines whether or not the current block is a merged block. If so, then control is passed to a function block 625. Otherwise, control is passed to the function block 630.

The function block 625 merges the current block according to the coded data, and passes control to an end block 699.

The function block 630 leaves the current block unmerged, and passes control to a function block 635. The function block 635 decodes implicitly coded motion data for the current block, and passes control to the end block 699.

Figure 7:
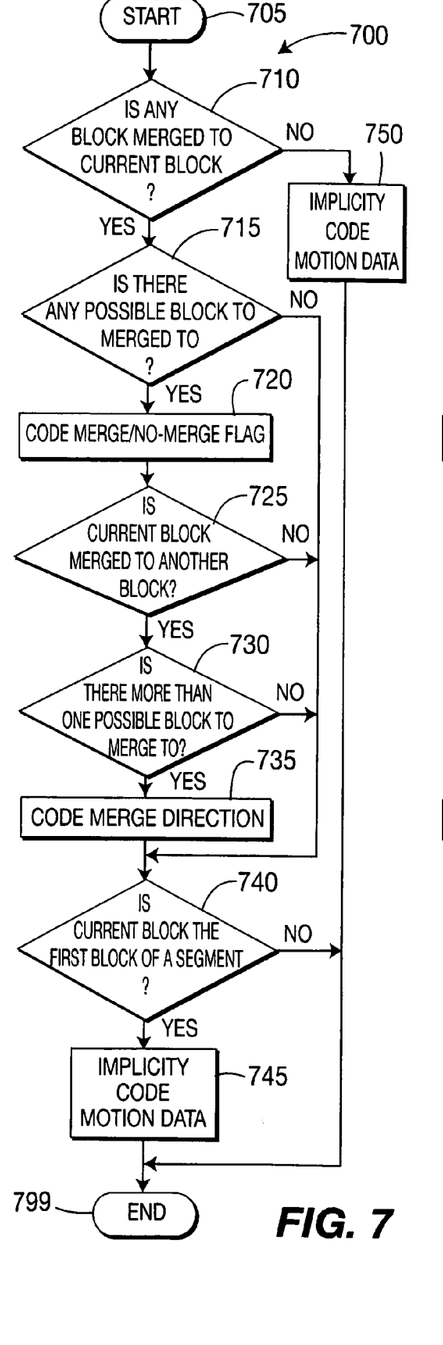
FIG. 7 is a flow diagram for an exemplary method for coding a merge enabled SKIP mode, in accordance with an embodiment of the present principles.

Turning to FIG. 7, an exemplary method for coding a merge enabled SKIP mode is indicated generally by the reference numeral 700.

The method 700 includes a start block that passes control to a decision block 710. The decision block 710 determines whether or not any block is merged with the current block. If so, then control is passed to a decision block 715. Otherwise, control is passed to a function block 750.

The decision block 715 determines whether or not there are any possible blocks to merge to. If so, then control is passed to a function block 720. Otherwise, control is passed to a decision block 740.

The function block 720 codes the merge/no-merge flag, and passes control to a decision block 725. The decision block 725 determines whether or not the current block is merged to another block. If so, then control is passed to a decision block 730. Otherwise, control is passed to the decision block 740.

The decision block 730 determines whether or not there is more than one possible block to merge to. If so, the control is passed to a function block 735. Otherwise, control is passed to the decision block 740.

The function block 735 codes the merge decision, and passes control to the decision block 740.

The decision block 740 determines whether or not the current block is the first block of a segment. If so, the control is passed to the function block 745. Otherwise, control is passed to an end block 799.

The function block 745 explicitly codes motion data for the current block, and passes control to the end block 799.

The function block 750 implicitly codes motion date for the current block, and passes control to the end block 799.

Figure 8:
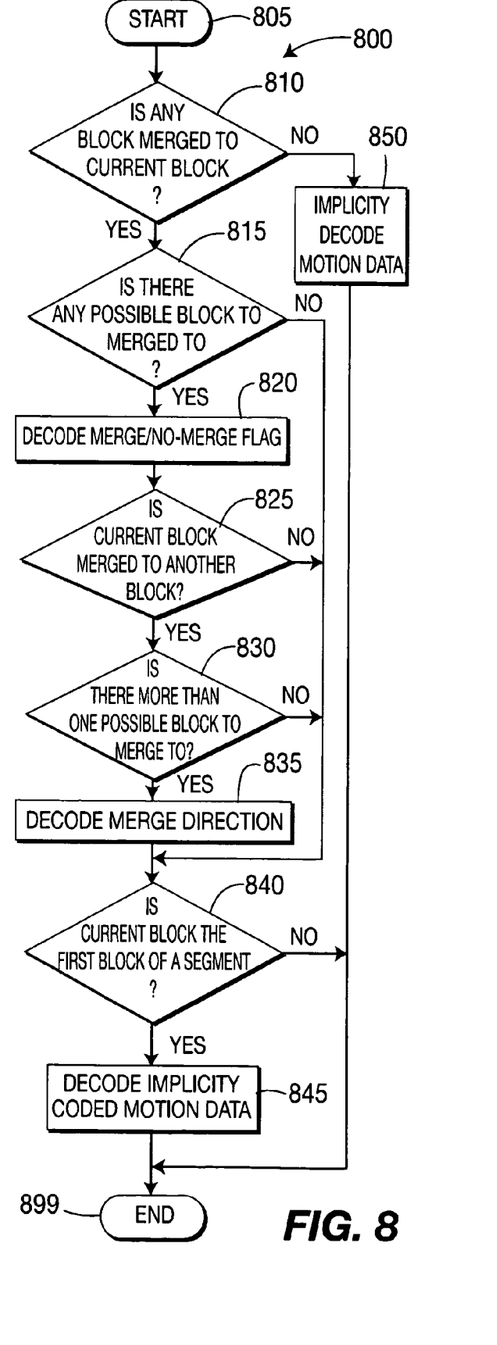
FIG. 8 is a flow diagram for an exemplary method for decoding a merge enabled SKIP mode, in accordance with an embodiment of the present principles.

Turning to FIG. 8, an exemplary method for decoding a merge enabled SKIP mode is indicated generally by the reference numeral 800.

The method 800 includes a start block that passes control to a decision block 810. The decision block 810 determines whether or not any block is merged with the current block. If so, then control is passed to a decision block 815. Otherwise, control is passed to a function block 850.

The decision block 815 determines whether or not there are any possible blocks to merge to. If so, then control is passed to a function block 820. Otherwise, control is passed to a decision block 840.

The function block 820 decodes the merge/no-merge flag, and passes control to a decision block 825. The decision block 825 determines whether or not the current block is merged to another block. If so, then control is passed to a decision block 830. Otherwise, control is passed to the decision block 840.

The decision block 830 determines whether or not there is more than one possible block to merge to. If so, the control is passed to a function block 835. Otherwise, control is passed to the decision block 840.

The function block 835 decodes the merge decision, and passes control to the decision block 840.

The decision block 840 determines whether or not the current block is the first block of a segment. If so, the control is passed to the function block 845. Otherwise, control is passed to an end block 899.

The function block 845 decodes explicitly coded motion data for the current block, and passes control to the end block 899.

The function block 850 implicitly decodes motion data for the current block, and passes control to the end block 899.

A description will now be given of some of the many attendant advantages/features of the present invention, some of which have been mentioned above. For example, one advantage/feature is an apparatus that includes an encoder for joint coding partitions of an image region using frame partitioning and a partition merging procedure, wherein any given one of the partitions that use a coding mode with implicit coding rules is subject to being merged, with another one of the partitions, using a distinct merging rule different than that used for a coding mode with explicit coding rules.

Another advantage/feature is the apparatus having the encoder as described above, wherein the given one of the partitions that uses the coding mode with the implicit coding rules is merged with the other one of the partitions by the merging procedure only when yet another partition is already merged with the given one of the partitions.

Yet another advantage/feature is the apparatus having the encoder as described above, wherein any of the partitions subject to merging are at least one of blocks or unions of blocks from a previously performed tree-based picture decomposition.

Moreover, another advantage/feature is the apparatus having the encoder as described above, wherein the coding mode with the implicit coding rules includes at least one of a SKIP mode, a DIRECT mode, and a mode for implicit coding of directional intra data.

Further, another advantage/feature is the apparatus having the encoder as described above, wherein the implicit coding rules are ignored and the explicit coding rules are used when a particular one of the partitions, to which the given one of the partitions that uses the coding mode with the implicit coding rules and the other one of the partitions is to be merged, is a first partition, in scanning order, in a segment of at least two merged partitions.

Also, another advantage/feature is the apparatus having the encoder as described above, wherein a possibility of merging at least two modes that have the implicit coding rules is enabled or disabled using a high level syntax.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
   an encoder for joint coding partitions of an image region using frame partitioning and a partition merging procedure, wherein any given one of the partitions that use a coding mode with implicit coding rules is subject to being merged, with another one of the partitions, using a distinct merging rule different than that used for a coding mode with explicit coding rules,
   wherein the implicit coding rules are ignored and the explicit coding rules are used when a particular one of the partitions, to which the given one of the partitions that uses the coding mode with the implicit coding rules and the other one of the partitions is to be merged, is a first partition, in scanning order, in a segment of at least two merged partitions.

2. The apparatus of claim 1, wherein the given one of the partitions that uses the coding mode with the implicit coding rules is merged with the other one of the partitions by the merging procedure only when yet another partition is already merged with the given one of the partitions.

3. The apparatus of claim 1, wherein any of the partitions subject to merging are at least one of blocks or unions of blocks from a previously performed tree-based picture decomposition.

4. The apparatus of claim 1, wherein the coding mode with the implicit coding rules includes at least one of a SKIP mode, a DIRECT mode, and a mode for implicit coding of directional intra data.

5. The apparatus of claim 1, wherein a possibility of merging at least two modes that have the implicit coding rules is enabled or disabled using a high level syntax.

6. In a video encoder, a method, comprising:
   joint coding partitions of an image region using frame partitioning and a partition merging procedure, wherein any given one of the partitions that use a coding mode with implicit coding rules is subject to being merged, with another one of the partitions, using a distinct merging rule different than that used for a coding mode with explicit coding rules,
   wherein the implicit coding rules are ignored and the explicit coding rules are used when a particular one of the partitions, to which the given one of the partitions that uses the coding mode with the implicit coding rules and the other one of the partitions is to be merged, is a first partition, in scanning order, in a segment of at least two merged partitions.

7. The method of claim 6, wherein the given one of the partitions that uses the coding mode with the implicit coding rules is merged with the other one of the partitions by the merging procedure only when yet another partition is already merged with the given one of the partitions.

8. The method of claim 6, wherein any of the partitions subject to merging are at least one of blocks or unions of blocks from a previously performed tree-based picture decomposition.

9. The method of claim 6, wherein the coding mode with the implicit coding rules includes at least one of a SKIP mode, a DIRECT mode, and a mode for implicit coding of directional intra data.

10. The method of claim 6, wherein a possibility of merging at least two modes that have the implicit coding rules is enabled or disabled using a high level syntax.

11. An apparatus, comprising:
    a decoder for joint decoding partitions of an image region using frame partitioning and a partition merging procedure, wherein any given one of the partitions that use a coding mode with implicit coding rules is subject to being merged, with another one of the partitions, using a distinct merging rule different than that used for a coding mode with explicit coding rules,
    wherein the implicit coding rules are ignored and the explicit coding rules are used when a particular one of the partitions, to which the given one of the partitions that uses the coding mode with the implicit coding rules and the other one of the partitions is to be merged, is a first partition, in scanning order, in a segment of at least two merged partitions.

12. The apparatus of claim 11, wherein the given one of the partitions that uses the coding mode with the implicit coding rules is merged with the other one of the partitions by the merging procedure only when yet another partition is already merged with the given one of the partitions.

13. The apparatus of claim 11, wherein any of the partitions subject to merging are at least one of blocks or unions of blocks from a previously performed tree-based picture decomposition.

14. The apparatus of claim 11, wherein the coding mode with the implicit coding rules includes at least one of a SKIP mode, a DIRECT mode, and a mode for implicit coding of directional intra data.

15. The apparatus of claim 11, wherein a possibility of merging at least two modes that have the implicit coding rules is enabled or disabled using a high level syntax.

16. In a video decoder, a method, comprising:
    joint decoding partitions of an image region using frame partitioning and a partition merging procedure, wherein any given one of the partitions that use a coding mode with implicit coding rules is subject to being merged, with another one of the partitions, using a distinct merging rule different than that used for a coding mode with explicit coding rules,
    wherein the implicit coding rules are ignored and the explicit coding rules are used when a particular one of the partitions, to which the given one of the partitions that uses the coding mode with the implicit coding rules and the other one of the partitions is to be merged, is a first partition, in scanning order, in a segment of at least two merged partitions.

17. The method of claim 16, wherein the given one of the partitions that uses the coding mode with the implicit coding rules is merged with the other one of the partitions by the merging procedure only when yet another partition is already merged with the given one of the partitions.

18. The method of claim 16, wherein any of the partitions subject to merging are at least one of blocks or unions of blocks from a previously performed tree-based picture decomposition.

19. The method of claim 16, wherein the coding mode with the implicit coding rules includes at least one of a SKIP mode, a DIRECT mode, and a mode for implicit coding of directional intra data.

20. The method of claim 16, wherein a possibility of merging at least two modes that have the implicit coding rules is enabled or disabled using a high level syntax.

21. A non-transitory storage media having video signal data encoded thereupon, comprising:
    partitions of an image region joint coded using frame partitioning and a partition merging procedure, wherein any given one of the partitions that use a coding mode with implicit coding rules is subject to being merged, with another one of the partitions, using a distinct merging rule different than that used for a coding mode with explicit coding rules, wherein the implicit coding rules are ignored and the explicit coding rules are used when a particular one of the partitions, to which the given one of the partitions that uses the coding mode with the implicit coding rules and the other one of the partitions is to be merged, is a first partition, in scanning order, in a segment of at least two merged partitions.

* * * * *